(12) United States Patent
Nishimura et al.

(10) Patent No.: US 10,353,121 B2
(45) Date of Patent: Jul. 16, 2019

(54) RETROREFLECTIVE MATERIAL

(71) Applicant: UNITIKA SPARKLITE LTD., Kyoto (JP)

(72) Inventors: Yasutaka Nishimura, Kyoto (JP); Motomu Fujiki, Kyoto (JP); Atsumi Nishigaki, Kyoto (JP)

(73) Assignee: UNITIKA SPARKLITE LTD. (JP)

( * ) Notice: Subject to any disclaimer, the term of this patent is extended or adjusted under 35 U.S.C. 154(b) by 65 days.

(21) Appl. No.: 15/129,881

(22) PCT Filed: Mar. 26, 2015

(86) PCT No.: PCT/JP2015/059363
§ 371 (c)(1),
(2) Date: Sep. 28, 2016

(87) PCT Pub. No.: WO2015/147161
PCT Pub. Date: Oct. 1, 2015

(65) Prior Publication Data
US 2017/0131443 A1 May 11, 2017

(30) Foreign Application Priority Data

Mar. 28, 2014 (JP) .................................. 2014-069195

(51) Int. Cl.
*B29D 11/00* (2006.01)
*B29K 67/00* (2006.01)
*G02B 5/128* (2006.01)

(52) U.S. Cl.
CPC .......... *G02B 5/128* (2013.01); *B29D 11/0074* (2013.01); *B29K 2023/06* (2013.01); *B29K 2067/003* (2013.01)

(58) Field of Classification Search
CPC .......... G02B 5/12; G02B 5/128; G02B 5/124; G02B 5/122; G02B 1/18; G02B 26/0816;
(Continued)

(56) References Cited

U.S. PATENT DOCUMENTS 5,620,775 A * 4/1997 LaPerre ................ G02B 5/128
156/298

FOREIGN PATENT DOCUMENTS

JP 60217302 A 10/1985
JP 02093684 A 4/1990
(Continued)

OTHER PUBLICATIONS

Kiya, Keiichi, et al., "Experimental and Analytical Studies on the Reflection-Characteristic of the Retro-Reflective Labels," Oyo Butsuri, Jan. 1975, vol. 44, No. 1, pp. 15-21.
(Continued)

*Primary Examiner* — Evan P Dzierzynski
*Assistant Examiner* — Sharrief I Broome
(74) *Attorney, Agent, or Firm* — McDonald Hopkins LLC

(57) ABSTRACT

The present invention aims to provide a retroreflective material that exhibits high reflective luminance for incident light with a large incident angle, and has excellent retroreflective performance for incident light with a wide incident angle. A retroreflective material includes a support, a fixing resin layer held on the support, transparent microspheres embedded in the fixing resin layer, and a reflective layer provided between the transparent microspheres and the fixing resin layer. In the retroreflective material, the transparent microspheres used have a refractive index of 1.6 to 2.5, and are exposed in air with an exposure ratio of 53 to 70%. The retroreflective material can thus have excellent retroreflective performance for incident light with a wide incident angle.

6 Claims, 2 Drawing Sheets

(58) Field of Classification Search
CPC .... G02B 27/2292; G02B 5/126; G02B 5/132; G02B 5/134; G02B 5/136; G02B 6/266; G02B 6/29307; G02B 6/2931; G02B 6/352; G02B 6/3548; G02B 6/356; G02B 6/03; Y10T 428/24355; Y10T 428/24372; Y10T 428/24942; Y10T 156/10; Y10T 156/1028; Y10T 428/25; Y10T 428/252; Y10T 428/31935; Y10T 156/1052; Y10T 428/1476; Y10T 428/1486; Y10T 428/24479; Y10T 428/24612; Y10T 428/24802; B32B 27/08; B32B 2307/416; B32B 2305/30; B32B 2315/08; B32B 27/20; B32B 3/30; B32B 2250/24; B32B 2255/10; B32B 2264/101; B32B 2307/75; B32B 27/308; B32B 27/36; B32B 7/02; B32B 7/12; B32B 2250/02; B32B 2250/44

See application file for complete search history.

(56) References Cited

FOREIGN PATENT DOCUMENTS

| JP | 11-514943 A | 12/1999 |
|---|---|---|
| JP | 2001318214 A | 11/2001 |
| JP | 2003-344626 A | 3/2003 |
| JP | 2004-184646 A | 2/2004 |
| JP | 2004184646 A * | 7/2004 |

OTHER PUBLICATIONS

Imada, Hirofumi., et al., "A three-dimensional analysis on retro-reflective characteristics of glass beads fixed in road markings," Proceedings of the Japan Society of Civil Engineers IV, Jan. 1990, No. 413/IV-12, pp. 39-47.

English translation of the International Search Report for PCT/JP2015/059363, dated Jun. 23, 2015.

* cited by examiner

RETROREFLECTIVE MATERIAL

CROSS-REFERENCE TO RELATED APPLICATION

This application is a 35 U.S.C. 371 national stage filing of PCT Application No. PCT/JP2015/059363, filed on Mar. 26, 2015, which claims the benefit of Japanese Patent Application No. 2014-069195, filed on Mar. 28, 2014, both of which are incorporated herein in their entirety by reference.

TECHNICAL FIELD

The present invention relates to a retroreflective material that retroreflects incident light. More specifically, the present invention relates to a retroreflective material that exhibits high reflective luminance for incident light with a large incident angle, and has excellent retroreflective performance for incident light with a wide incident angle.

BACKGROUND ART

Conventionally, retroreflective materials that retroreflect incident light are widely used for indications such as traffic signs, or for identification of marine accident equipment, and particularly for enhancing visibility during the nighttime. From the viewpoint of ensuring the safety of people who work at night, such retroreflective materials are also widely used as safety clothing for policemen, firefighters, workers involved in civil engineering and construction, and the like, in safety clothes, safety vests, sashes, arm bands, life vests, and the like. Further, in recent years, along with a growing consciousness of the safety of life, or the diversification of decorativeness, such retroreflective materials are also used in apparel such as windbreakers, sweat suits, T-shirts, sports shoes, and swimming suits as measures for preventing traffic accidents during the nighttime, or used in bags, suitcases, and the like for decorative purposes.

A typical retroreflective material has a structure in which transparent microspheres are additionally provided on a reflective layer, whereby light incident through the transparent microspheres is reflected at the reflective layer, and light is emitted through the transparent microspheres, so that light is retroreflected. In the retroreflective material with such a structure, a transparent resin layer may be provided between the reflective layer and the transparent microspheres to adjust the reflective luminance or the color tone of the reflected light. Conventional retroreflective materials are broadly classified into the three types, i.e., an open type, a closed type, and an encapsulated type, in accordance with the manner in which the transparent microspheres are embedded. In an open-type retroreflective material, a portion of the transparent microspheres are exposed in the air (see, for example, Patent Literature 1). In a closed-type retroreflective material, surfaces of the transparent microspheres (surfaces positioned opposite to the surfaces facing the reflective layer) are covered with a resin layer (see, for example, Patent Literature 2). In an encapsulated-type retroreflective material, there is space over the surfaces of the transparent microspheres (surfaces positioned opposite to the surfaces facing the reflective layer), and a resin layer is present over that space (see, for example, Patent Literature 3). Among these types, open-type retroreflective materials find wide application in the field of clothing, because they have high reflective luminance as well as flexibility.

On the other hand, while the conventional open-type retroreflective materials exhibit sufficient reflective performance for light incident from the front (i.e., incident light with a small incident angle), they have the drawback of having low reflective performance for light incident in an oblique direction (i.e., incident light with a large incident angle), which reduces the reflective luminance to result in poor visibility.

In recent years, an endless list of demands exists for enhancing the safety and decorativeness. In order to meet these demands, there is an earnest desire for the development of a technology of enhancing the retroreflective performance for incident light with a wide incident angle in open-type retroreflective materials.

CITATION LIST

Patent Literature

Patent Literature 1: JP 2001-318214 A
Patent Literature 2: JP S60-217302 A
Patent Literature 3: JP H2-93684 A

SUMMARY OF INVENTION

Technical Problem

The present invention aims to provide a retroreflective material that exhibits high reflective luminance for incident light with a large incident angle, and has excellent retroreflective performance for incident light with a wide incident angle.

Solution to Problem

The present inventors conducted extensive research to solve the aforementioned problem, and found that when the exposure ratio of transparent microspheres in an open-type retroreflective material is controlled within a predetermined range, the open-type retroreflective material can maintain high reflective luminance for incident light with a large incident angle, and can have excellent retroreflective performance for incident light with a wide incident angle. More specifically, the present inventors found that in a retroreflective material including a support, a fixing resin layer held on the support, transparent microspheres embedded in the fixing resin layer, and a reflective layer provided between the transparent microspheres and the fixing resin layer, when the transparent microspheres used have a refractive index of 1.6 to 2.5, and are exposed in air with an exposure ratio of 53 to 70%, the retroreflective material can have excellent retroreflective performance with respect to a wide incident angle. The present invention was completed as a result of further research conducted based on this finding.

In summary, the present invention provides embodiments of the retroreflective material as itemized below.

Item 1. A retroreflective material including:
a fixing resin layer;
transparent microspheres embedded in the fixing resin layer; and
a reflective layer provided between the transparent microspheres and the fixing resin layer,
the transparent microspheres having a refractive index of 1.6 to 2.5, and
the transparent microspheres being exposed in air with an exposure ratio of 53 to 70%.

Item 2. The retroreflective material according to item 1, wherein the transparent microspheres have an average particle size of 30 to 200 μm.

Item 3. The retroreflective material according to item 1 or 2, wherein the transparent microspheres have an average particle size of 40 to 120 μm.

Item 4. The retroreflective material according to any of items 1 to 3, wherein the transparent microspheres are embedded in contact with a surface of the reflective layer.

Item 5. The retroreflective material according to any of items 1 to 3, wherein a transparent resin layer is provided between the transparent microspheres and the reflective layer.

Item 6. The retroreflective material according to any of items 1 to 5, wherein the retroreflective material has retroreflective performance of 100 cd/lx/m$^2$ or more for incident light with an incident angle of 60°, as measured at an observation angle of 0.2° in accordance with a method defined in JIS Z9117 (2010).

Item 7. The retroreflective material according to any of items 1 to 5, further including a support, wherein the fixing resin layer is held on the support.

Advantageous Effects of Invention

The retroreflective material of the present invention, which can exhibit high reflective luminance for incident light with an incident angle of about 60°, and has excellent retroreflective performance with respect to a wide incident angle, provides remarkably enhanced visibility and decorativeness, and is therefore usable for the purpose of imparting safety and decorativeness in a variety of fields such as safety clothing, apparel, bags, suitcases, and shoes.

DESCRIPTION OF EMBODIMENTS

Figure 1:
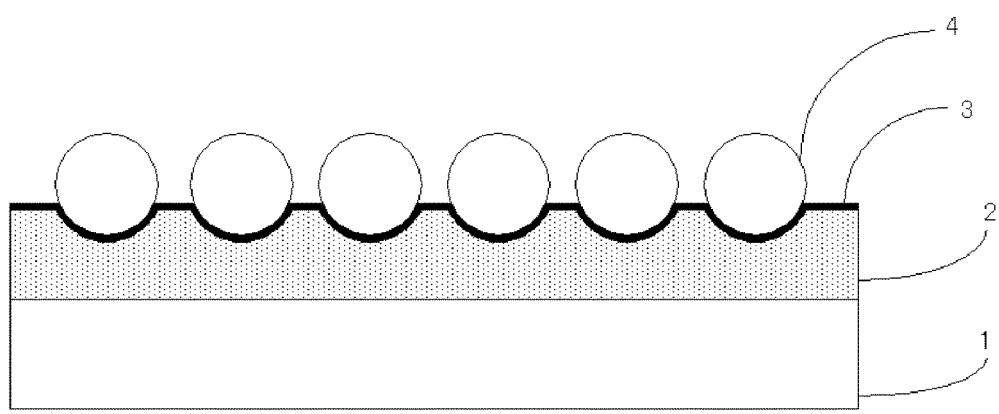
FIG. 1 is a diagram showing a cross-sectional structure of one embodiment of the retroreflective material of the present invention.

The retroreflective material of the present invention includes transparent microspheres embedded in the fixing resin layer, and a reflective layer provided between the transparent microspheres and the fixing resin layer, the transparent microspheres having a refractive index of 1.6 to 2.5, and the transparent microspheres being exposed in air with an exposure ratio of 53 to 70%. The retroreflective material of the present invention will be hereinafter described in detail.

Fixing Resin Layer

The fixing resin layer, which is held on the above-described support, serves to hold the transparent microspheres embedded therein.

The resin forming the fixing resin layer is not limited as long as it can hold the transparent microspheres embedded therein, and may be designed as appropriate in consideration of flexibility and the like required in the retroreflective material. Specific examples of the resin forming the fixing resin layer include polyolefin resins (polyethylene, polypropylene, etc.), ethylene-vinyl acetate copolymer resins, polyvinyl alcohols, acrylic resins, urethane resins, and ester resins. Among the above, urethane resins may be preferred from the viewpoint of imparting excellent flexibility.

The resin forming the fixing resin layer may optionally be copolymerized with a silane coupling agent. Through this copolymerization with a silane coupling agent, the fixing resin layer can have durability, adhesiveness, and the like. Further, the resin forming the fixing resin layer may optionally be cross-linked with a cross-linking agent such as a polyisocyanate cross-linking agent, an epoxy cross-linking agent, or a melamine resin. Through this cross-linking with a cross-linking agent, the fixing resin layer can have heat resistance, wash resistance, and the like.

The fixing resin layer may also contain additives such as dyes, pigments, phosphorescent pigments, and inorganic fillers, depending on the use, required function, and the like of the retroreflective material.

While the thickness of the fixing resin layer is not limited as long as it can hold the transparent microspheres embedded therein, the thickness may be 15 to 300 μm, for example, and preferably 20 to 200 μm.

Reflective Layer

The reflective layer, which is provided between the transparent microspheres and the above-described fixing resin layer, serves to retroreflect light incident from the transparent microspheres.

While the material forming the reflective layer is not limited as long as it can retroreflect light incident from the transparent microspheres, the reflective layer is preferably formed of a metal film. Specific examples of metals forming the metal film include aluminum, titanium, zinc, silica, tin, nickel, and silver. Among these metals, aluminum may be preferred from the viewpoint of imparting further improved retroreflective performance.

While the thickness of the reflective layer is not limited, it is 100 to 2000 Å, for example, and preferably 600 to 1000 Å.

Transparent Resin Layer

Figure 2:
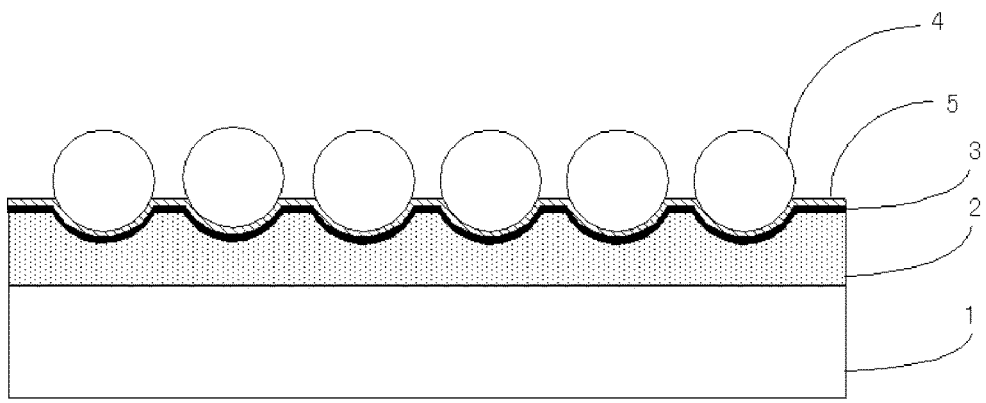
FIG. 2 is a diagram showing a cross-sectional structure of one embodiment of the retroreflective material of the present invention.

The transparent resin layer is a layer optionally provided between the transparent microspheres and the above-described reflective layer. That is, the transparent resin layer may or may not be provided in the retroreflective material of the present invention. As exemplary cross-sectional structures of the retroreflective material of the present invention, FIG. 1 shows a cross-sectional structure without the transparent resin layer, and FIG. 2 shows a cross-sectional structure with the transparent resin layer. With the transparent resin layer, the reflective luminance can be adjusted, or the color tone of emitted light can be changed. Where the reflective layer is formed of a metal film, the transparent resin layer makes the reflective layer resistant to corrosion.

While the resin forming the transparent resin layer is not limited as long as it has optical transparency, examples of the resin forming the transparent resin layer include acrylic resins, polyurethane resins, and polyester resins. The resin forming the transparent resin layer may optionally be copolymerized with a silane coupling agent, for the purpose of imparting durability, adhesiveness, and the like to the transparent resin layer. Further, the resin forming the transparent resin layer may optionally be cross-linked with a cross-linking agent such as a polyisocyanate cross-linking agent, an epoxy cross-linking agent, or a melamine resin, for the purpose of imparting heat resistance, wash resistance, and the like to the transparent resin layer.

The transparent resin layer may also contain additives such as ultraviolet absorbents, antioxidants, dyes, pigments, phosphorescent pigments, and inorganic fillers, depending on the use, required function, and the like of the retroreflective material.

Further, the transparent resin layer may optionally be provided with a decoration such as a pattern or letters on a surface thereof not in contact with the transparent microspheres (i.e., the surface exposed in the air).

While the thickness of the transparent resin layer may be set as appropriate in light of the required reflective luminance, color tone, and the like, the thickness may be 0.1 to 30 μm, for example, and preferably 0.1 to 1.0 μm.

Transparent Microspheres

The transparent microspheres, which are embedded in the above-described fixing resin layer with the above-described reflective layer therebetween, serve to pass incident light and emitted light retroreflected at the above-described reflective layer. Where the above-described transparent resin layer is not provided, the transparent microspheres are embedded in contact with a surface of the above-described reflective layer (see FIG. 1). Where the above-described transparent resin layer is provided, the transparent microspheres are embedded in contact with a surface of the above-described transparent resin layer (see FIG. 2).

In the present invention, transparent microspheres with a refractive index of 1.6 to 2.5 are used. Use of the transparent microspheres with such a refractive index leads to excellent retroreflective performance with the reflective layer brought into focus. From the viewpoint of imparting further improved retroreflective performance, the refractive index of the transparent microspheres is preferably 1.8 to 2.2, and more preferably 1.9 to 2.1.

The transparent microspheres are placed to be exposed in the air with an exposure ratio of 53 to 70%. When the transparent microspheres are exposed in the air in the range where the above-defined exposure ratio is satisfied, the retroreflective material can exhibit high reflective luminance for incident light with an incident angle of about 60°, and can have excellent retroreflective performance with respect to a wide incident angle. From the viewpoint of further enhancing the reflective luminance for incident light with a large incident angle, the exposure ratio of the transparent microspheres is preferably 56 to 66%, and more preferably 57 to 64%. As used herein, the exposure ratio of the transparent microspheres refers to the ratio (%) of the height of the region where the transparent microspheres are exposed, with respect to the diameter of the transparent microspheres, and represents a value calculated in accordance with the following equation:

Exposure ratio (%) of the transparent microspheres= $(X/R) \times 100$, where:

R represents the diameter of the transparent microspheres; and

X represents the height from the top part of the surface of the reflective layer to the top part of the surfaces of the transparent microspheres exposed in the air, or represents, where the transparent resin layer is provided, the height from the top part of the surface of the reflective layer on the transparent resin layer to the top part of the surfaces of the transparent microspheres exposed in the air.

The above-described exposure ratio herein represents a value calculated as an average of values obtained by measuring the respective exposure ratios of 30 or more transparent microspheres embedded in the retroreflective material.

From the viewpoint of further enhancing the reflective luminance for incident light with a large incident angle, the average particle size of the transparent microspheres is generally 30 to 200 μm, preferably 40 to 120 μm, more preferably 50 to 100 μm, and particularly preferably 75 to 90 μm. The average particle size of the transparent microspheres herein represents a value obtained by measuring the maximum diameter of each transparent microsphere for 30 transparent microspheres, using a microscope set at 500 times magnification, and by calculating an average of the obtained values.

The material of the transparent microspheres is not limited as long as it may have the above-described refractive index, and may be any of a glass, a resin, and the like; however, glass transparent microspheres are suitably used in the present invention because they are excellent in transparency, chemical resistance, wash resistance, weather resistance, and the like.

In the retroreflective material of the present invention, the number of transparent microspheres embedded per unit area may be set as appropriate depending on the intended retroreflective performance. For example, the number of transparent microspheres per 1 $mm^2$ of the retroreflective material is 50 to 500, preferably 100 to 250, and more preferably 150 to 180. In particular, when the number of transparent microspheres that are exposed with an exposure ratio of 53 to 70% falls within the above-defined range, the retroreflective material can have remarkably improved retroreflective performance with respect to a wide incident angle.

Support

The support serves as a substrate for holding the fixing resin layer thereon. In the retroreflective material of the present invention, the support is an optional member, and may not be provided in the distribution stage, for example. The support may be directly laminated on the above-described fixing resin layer, or may be laminated on the fixing resin layer with an adhesive layer formed of an adhesive therebetween.

The support serves as a substrate for holding the fixing resin layer thereon. The support may be designed as appropriate in light of the use, required strength and flexibility, and the like of the retroreflective material. Examples of materials of the support include natural fibers such as pulp; resins such as polyesters, for example, polyethylene terephthalate and polyethylene naphthalate; and metals. While the shape of the support is not limited, the support may be in the form of a sheet such as a woven knit, a nonwoven fabric, a film, or paper; threads; or cords, for example.

Performance and Uses

The retroreflective material of the present invention exhibits high reflective luminance for incident light with an incident angle of about 60°, and has excellent retroreflective performance with respect to a wide incident angle. The retroreflective performance of the retroreflective material of the present invention may specifically be such that the retroreflective performance for incident light with an incident angle of 60° is 100 $cd/lx/m^2$ or more, preferably (150) $cd/lx/m^2$ or more, more preferably (180 to 300) $cd/lx/m^2$, and particularly preferably 200 to 300 $cd/lx/m^2$. As used herein, the retroreflective performance ($cd/lx/m^2$) for incident light with an incident angle of 60° refers to a value measured at an incident angle of 60° and an observation angle of 0.2°, in accordance with the method defined in JIS Z9117 (2010). A retroreflective material, when attached to a cloth, for example, is curved along the contour of the body of the wearer. Thus, retroreflective materials in the conventional art have had a problem in that when attached to clothes, they cannot retroreflect light in the curved sections, and have a reduced amount of portions where light is sufficiently retroreflected. On the contrary, the retroreflective material of the present invention, which has excellent retroreflective performance with respect to a wide incident angle, exhibits improved retroreflective properties in a curved section. In particular, where the retroreflective performance for incident light with an incident angle of 60° satisfies 100 cd/lx/m$^2$ or more, retroreflective properties in the curved section are extremely good, such that when the retroreflective material is attached to a cloth, the amount of portions where light is sufficiently retroreflected is increased, which is preferable.

The retroreflective material of the present invention can find application not only in apparel, road markings, and the like, but also in a variety of uses. For example, the retroreflective material of the present invention may be used for retroreflective-type photoelectric sensor applications, touch panel applications, and the like. Specifically, the retroreflective material of the present invention can be used for a retroreflective-type photoelectric sensor to widen the operating angle (directional angle). In this case, effects not heretofore attained by conventional retroreflective materials can be achieved, for example, the number of reflectors formed of the retroreflective material, which are installed on a production line, can be reduced. The retroreflective material of the present invention can also be used for touch panel applications, particularly infrared retroreflective detection-type touch panels. In this case, the retroreflective material of the present invention can deal with recent high-aspect-ratio screens better.

Production Method

While the method for producing the retroreflective material of the present invention is not limited as long as it can produce the retroreflective material having the above-described features, the method may, for example, include the following steps 1 to 6:

step 1: heating a release support in which a thermoplastic film is laminated on a base film at a temperature not lower than the softening point of the thermoplastic film to soften the thermoplastic film;

step 2: prior to, simultaneously with, or subsequent to step 1, dispersing transparent microspheres over the thermoplastic film of the release support, and cooling the resulting material to cure the thermoplastic film at the time when 53 to 70% of the diameter of the transparent microspheres has been embedded in the softened thermoplastic film, to obtain a release support in which the transparent microspheres are embedded;

step 3: optionally forming a transparent resin layer by applying a resin forming the transparent resin layer to a surface with the transparent microspheres of the release support in which the transparent microspheres are embedded;

step 4: laminating a reflective layer on the surface with the transparent microspheres of the release support in which the transparent microspheres are embedded, or on the transparent resin layer;

step 5: laminating a fixing resin layer on the reflective layer by applying a resin forming the fixing resin layer; and step 6: bonding the fixing resin layer with a support subsequent to removing the release support, or removing the release support subsequent to bonding the fixing resin layer with the support.

While the base film of the release support used in step 1 is not limited as long as it can stably retain its shape at the softening temperature of the thermoplastic film, examples of the base film include polyester films such as polyethylene terephthalate and polyethylene naphthalate. As the thermoplastic film of the release support used in step 1, a resin film that softens at low temperature is preferred. Examples of such resin films include polyolefin resin films such as polyethylene and polypropylene. The thickness of the thermoplastic film of the release support used in step 1 may be set depending on the average particle size of the transparent microspheres.

In the second step, the transparent microspheres are embedded in the thermoplastic film because the transparent microspheres placed on the thermoplastic film in a softened state are allowed to gravity settle. Thus, the size and density of the transparent microspheres, as well as the density and the thickness of the thermoplastic film, for example, are to be considered in the first step, and then in the second step, the degree of softening of the thermoplastic film may be controlled such that 53 to 70% of the diameter of the transparent microspheres is embedded in the thermoplastic film, by appropriately adjusting the heating temperature and time for softening.

For example, where transparent glass beads having a refractive index of 1.9 to 2.1 and an average particle size of 50 to 100 µm are used as the transparent microspheres, a polyester film is used as the base film of the release support, and a polyethylene film is used as the thermoplastic film of the release support, the thermoplastic film may be softened by heating in the first step, with the heating temperature adjusted in the range of temperatures preferably from 150° C. to 230° C., and more preferably 180° C. to 220° C., and the heating time adjusted in the range of 2 to 3 minutes. This facilitates embedding 53 to 70% of the diameter of the transparent microspheres into the thermoplastic film in the second step. In the case described above, if heat treatment is performed, for example, at a temperature of 150° C. or lower for 2 to 3 minutes in the first step, the embedding ratio of the transparent microspheres into the thermoplastic film tends to be less than 53%. In particular, where transparent glass beads having a refractive index of 1.9 to 2.1 and an average particle size of 75 to 90 µm are used as the transparent microspheres, a polyester film is used as the base film of the release support, and a polyethylene film is used as the thermoplastic film of the release support, the thermoplastic film may be softened by heating in the first step, with the heating temperature adjusted in the range of temperatures preferably from 190° C. to 220° C., and the heating time adjusted in the range of 2 to 3 minutes.

Where transparent glass beads with a refractive index of 1.9 to 2.1 and an average particle size of 50 to 100 µm are used as the transparent microspheres, and a low density polyethylene film is used as the thermoplastic film of the release support, heating may be performed in the first step at a temperature of 150° C. to 230° C., and preferably 180° C. to 220° C. This facilitates gravity settling of the transparent microspheres in a short period of time in the second step, compared to the case where a polyethylene film with a density higher than that of the low density polyethylene is used. This is likely to be advantageous in continuous operation, for example. Further, in the case described above, the thickness of the low density polyethylene film may be adjusted such that the embedding ratio of the transparent microspheres is 53 to 70%, by sinking the above-described transparent microspheres down to the polyester film interface. This facilitates achieving a uniform embedding ratio of the respective transparent microspheres.

The third and fourth steps are performed subsequent to the second step, after the thermoplastic film is returned to the cured state by being cooled or allowed to cool.

The third step is performed when the transparent resin layer is provided between the transparent microspheres and the reflective layer. The resin forming the transparent resin layer may be applied to the surface with the transparent microspheres, using a known resin coating method.

In the fourth step, the reflective layer may be formed using a known metal film formation method such as vapor deposition, sputtering, chemical vapor deposition, or plating. Vapor deposition may be preferred as the method of forming the reflective layer.

In the fifth step, the resin forming the fixing resin layer may be applied onto the reflective layer, using a known resin coating method.

In the sixth step, the method of bonding the fixing resin layer with the support is not limited, and may be a known lamination method.

EXAMPLES

The present invention will be specifically described below with reference to examples, which are not intended to limit the invention.

It should be noted that the average particle size of the transparent glass beads used in the following test examples represents a value obtained by measuring the maximum diameter of each transparent microsphere for 30 transparent microspheres, using a microscope (trade name: Digital Microscope VHX-1000; Keyence Corporation) set at 500 times magnification, and by calculating an average of the obtained values. Moreover, in the following test examples, the exposure ratio of the transparent glass beads represents a value obtained in accordance with the equation shown above, by observing 30 or more transparent microspheres embedded in the retroreflective material under a microscope (trade name: Digital Microscope VHX-1000; Keyence Corporation), and measuring the heights of the transparent glass beads exposed in the air.

Test Example 1

1. Production of Retroreflective Material

Example 1

A release support made of a 40-μm-thick polyethylene film laminated on a 75-μm-thick polyester film was used, and the release support was heated at 200° C. for 2 minutes to melt the polyethylene film. In this state, transparent glass beads with an average particle size of 79 μm and a refractive index of 1.93 as transparent microspheres were dispersed in an amount of 150 to 180 transparent glass beads/mm² over substantially one surface, and the resulting material was allowed to cool to cure the polyethylene film. Next, aluminum was deposited by the vapor deposition method on the surface with the transparent glass beads of the release support, thus forming a 700-Å-thick reflective layer. Further, polyethylene terephthalate (hereinafter sometimes abbreviated as PET) was applied onto the reflective layer, thus forming a fixing resin layer. A polyester-cotton taffeta fabric used as a support was subsequently bonded with the fixing resin layer using a hot press at 130° C., and then the release support was removed.

In this way, a retroreflective material was obtained sequentially including the polyester-cotton taffeta fabric (support)/PET (fixing resin layer)/the aluminum film (reflective layer)/the transparent glass beads. The exposure ratio of the transparent glass beads in the retroreflective material was measured to be 54%.

Example 2

A retroreflective material was produced under the same conditions as those in Example 1, except that the polyethylene film was heated at 190° C. for 3 minutes. The exposure ratio of the transparent glass beads of the retroreflective material was 56%.

Example 3

A retroreflective material was produced under the same conditions as those in Example 1, except that the polyethylene film was heated at 200° C. for 3 minutes. The exposure ratio of the transparent glass beads of the retroreflective material was 57%.

Example 4

A retroreflective material was produced under the same conditions as those in Example 1, except that the polyethylene film was heated at 210° C. for 3 minutes. The exposure ratio of the transparent glass beads of the retroreflective material was 64%.

Example 5

A retroreflective material was produced under the same conditions as those in Example 1, except that the polyethylene film was heated at 220° C. for 3 minutes. The exposure ratio of the transparent glass beads of the retroreflective material was 66%.

Comparative Example 1

A retroreflective material was produced under the same conditions as those in Example 1, except that the polyethylene film was heated at 160° C. for 3 minutes. The exposure ratio of the transparent glass beads of the retroreflective material was 31%.

Comparative Example 2

A retroreflective material was produced under the same conditions as those in Example 1, except that the polyethylene film was heated at 180° C. for 3 minutes. The exposure ratio of the transparent glass beads of the retroreflective material was 45%.

Comparative Example 3

A retroreflective material was produced under the same conditions as those in Example 1, except that the polyethylene film was heated at 220° C. for 6 minutes. The exposure ratio of the transparent glass beads of the retroreflective material was 80%.

2. Evaluation of the Retroreflective Performance of the Retroreflective Materials Each of the retroreflective materials was evaluated for retroreflective performance in the range of incident angles of 5 to 60°. The retroreflective performance was evaluated in accordance with the method defined in JIS Z9117 (2011). Specifically, the evaluation was performed under the following conditions.

2-1. Specimens

Each of the retroreflective materials was cut into pieces having a width of 70 mm and a length of 150 mm. Each cut piece of the retroreflective material was attached to an A5052P aluminum plate having a width of 70 mm, a length of 150 mm, and a thickness of 0.5 mm (hereinafter referred to as the aluminum plate), using a double-sided adhesive tape, such that the surface of the polyester-cotton taffeta fabric (support) of each piece of the retroreflective material became the surface to be bonded. In this way, specimens were obtained. The number of specimens was six for each of the retroreflective materials. The resulting specimens were allowed to stand in a chamber controlled to a temperature of 23±2° C. and a relative humidity of 50±15%. The six specimens prepared for each retroreflective material were subsequently aligned to make 420 mm×150 mm.

2-2. Test Apparatus

A test apparatus equipped with a projector having an emission port diameter of 3.4 mm and a light receiver (trade name: BM-5A; Topcon Positioning Systems, Inc.) was used, and the distance from the lens surface of the projector to the surface of each specimen, as well as the distance from the specimen surface to the light receiver, was adjusted to 15 m. Standard illuminant A was used as the light source of the projector. The light receiver used had a visible-region relative spectral responsivity characteristic approximated to the standard spectral luminous efficiency, and a color correction was made as required.

2-3. Observation Angle and Incident Angle, as Well as Measurement

The observation angle was set to 0.2°, and the incident angle was set to 5°, 20°, 30°, 40°, 50°, and 60°, provided that the clockwise direction was defined as positive. The retroreflective performance (cd/lx/m²) at each incident angle was measured.

The obtained results are shown in Table 1. These results confirmed that the retroreflective materials according to Examples 1 to 5 exhibit retroreflective performance for incident light with large incident angles remarkably higher than that of the retroreflective materials according to Comparative Examples 1 to 3, and these retroreflective materials also have improved retroreflective performance for incident light with an incident angle of 60°.

Test Example 2

1. Production of Retroreflective Materials

Example 6

A retroreflective material was produced under the same conditions as those in Example 1, except that transparent glass beads with an average particle size of 65 μm and a refractive index of 1.93 were used, and the polyethylene film was heated at 180° C. for 3 minutes. The exposure ratio of the transparent glass beads of the retroreflective material was 59%.

Example 7

A retroreflective material was produced under the same conditions as those in Example 6, except that the polyethylene film was heated at 190° C. for 3 minutes. The exposure ratio of the transparent glass beads of the retroreflective material was 66%.

Example 8

A retroreflective material was produced under the same conditions as those in Example 6, except that the polyethylene film was heated at 210° C. for 3 minutes. The exposure ratio of the transparent glass beads of the retroreflective material was 69%.

Example 9

A retroreflective material was produced under the same conditions as those in Example 6, except that the polyethylene film was heated at 220° C. for 3 minutes. The exposure ratio of the transparent glass beads of the retroreflective material was 70%.

Comparative Example 4

A retroreflective material was produced under the same conditions as those in Example 6, except that the polyethylene film was heated at 160° C. for 3 minutes. The exposure ratio of the transparent glass beads of the retroreflective material was 52%.

Comparative Example 5

A retroreflective material was produced under the same conditions as those in Example 6, except that the polyeth-

TABLE 1

Retroreflective Performance (Observation Angle: 0.2°; cd/lx/m²)

|  |  | Comp. Ex. 1 | Comp. Ex. 2 | Ex. 1 | Ex. 2 | Ex. 3 | Ex. 4 | Ex. 5 | Comp. Ex. 3 |
|---|---|---|---|---|---|---|---|---|---|
| Exposure Ratio (%) of Transparent Glass Beads |  | 31 | 45 | 54 | 56 | 57 | 64 | 66 | 80 |
| Incident Angle | 5° | 648 | 635 | 589 | 621 | 527 | 599 | 624 | 539 |
|  | 20° | 535 | 637 | 597 | 625 | 524 | 607 | 624 | 480 |
|  | 30° | 341 | 634 | 595 | 619 | 517 | 599 | 616 | 410 |
|  | 40° | 166 | 551 | 559 | 572 | 510 | 567 | 579 | 314 |
|  | 50° | 82 | 312 | 399 | 428 | 415 | 437 | 434 | 170 |
|  | 60° | 29 | 98 | 170 | 197 | 212 | 212 | 190 | 50 | ylene film was heated at 220° C. for 6 minutes. The exposure ratio of the transparent glass beads of the retroreflective material was 75%.

2. Evaluation of the Retroreflective Performance of the Retroreflective Materials Each of the retroreflective materials was evaluated for retroreflective performance, using the same method as that in Test Example 1 above. The obtained results are shown in Table 2. These results confirmed that the retroreflective materials according to Examples 7 to 9 exhibit retroreflective performance for incident light with large incident angles remarkably higher than that of the retroreflective materials according to Comparative Examples 4 and 5, and these retroreflective materials also have improved retroreflective performance for incident light with an incident angle of 60°.

TABLE 2

Retroreflective Performance (Observation Angle: 0.2°; cd/lx/m$^2$)

|  |  | Comp. Ex. 4 | Ex. 6 | Ex. 7 | Ex. 8 | Ex. 9 | Comp. Ex. 5 |
|---|---|---|---|---|---|---|---|
| Exposure Ratio (%) of Transparent Glass Beads |  | 52 | 59 | 66 | 69 | 70 | 75 |
| Incident Angle | 5° | 503 | 515 | 512 | 509 | 507 | 461 |
|  | 20° | 505 | 531 | 507 | 501 | 491 | 418 |
|  | 30° | 495 | 525 | 500 | 481 | 467 | 370 |
|  | 40° | 431 | 464 | 449 | 428 | 408 | 285 |
|  | 50° | 261 | 285 | 306 | 300 | 272 | 154 |
|  | 60° | 85 | 138 | 128 | 121 | 113 | 42 |

Test Example 3

1. Production of Retroreflective Materials

Example 10

A retroreflective material was produced under the same conditions as those in Example 1, except that transparent glass beads with an average particle size of 56 μm and a refractive index of 1.93 were used, and the polyethylene film was heated at 180° C. for 3 minutes. The exposure ratio of the transparent glass beads of the retroreflective material was 53%.

Example 11

A retroreflective material was produced under the same conditions as those in Example 10, except that the polyethylene film was heated at 200° C. for 2 minutes. The exposure ratio of the transparent glass beads of the retroreflective material was 61%.

Example 12

A retroreflective material was produced under the same conditions as those in Example 10, except that the polyethylene film was heated at 200° C. for 3 minutes. The exposure ratio of the transparent glass beads of the retroreflective material was 64%.

Example 13

A retroreflective material was produced under the same conditions as those in Example 10, except that the polyethylene film was heated at 220° C. for 3 minutes. The exposure ratio of the transparent glass beads of the retroreflective material was 70%.

Comparative Example 6

A retroreflective material was produced under the same conditions as those in Example 10, except that the polyethylene film was heated at 160° C. for 3 minutes. The exposure ratio of the transparent glass beads of the retroreflective material was 51%.

Comparative Example 7

A retroreflective material was produced under the same conditions as those in Example 10, except that the polyethylene film was heated at 220° C. for 3 minutes. The exposure ratio of the transparent glass beads of the retroreflective material was 72%.

2. Evaluation of the Retroreflective Performance of the Retroreflective Materials Each of the retroreflective materials was evaluated for retroreflective performance, using the same method as that in Test Example 1 above. The obtained results are shown in Table 3. These results also confirmed that the retroreflective materials according to Examples 10 to 13 exhibit retroreflective performance for incident light with large incident angles remarkably higher than that of the retroreflective materials according to Comparative Examples 6 and 7, and these retroreflective materials also have improved retroreflective performance for incident light with an incident angle of 60°.

TABLE 3

Retroreflective Performance (Observation Angle: 0.2°; cd/lx/m$^2$)

|  |  | Comp. Ex. 6 | Ex. 10 | Ex. 11 | Ex. 12 | Ex. 13 | Comp. Ex. 7 |
|---|---|---|---|---|---|---|---|
| Exposure Ratio (%) of Transparent Glass Beads |  | 51 | 53 | 61 | 64 | 70 | 72 |
| Incident Angle | 5° | 442 | 388 | 405 | 438 | 317 | 466 |
|  | 20° | 449 | 409 | 412 | 441 | 325 | 421 |
|  | 30° | 456 | 403 | 511 | 443 | 324 | 376 |
|  | 40° | 385 | 348 | 390 | 418 | 312 | 310 |
|  | 50° | 209 | 279 | 307 | 282 | 239 | 189 |
|  | 60° | 58 | 124 | 146 | 103 | 100 | 57 |

Comprehensive Consideration

Figure 3:
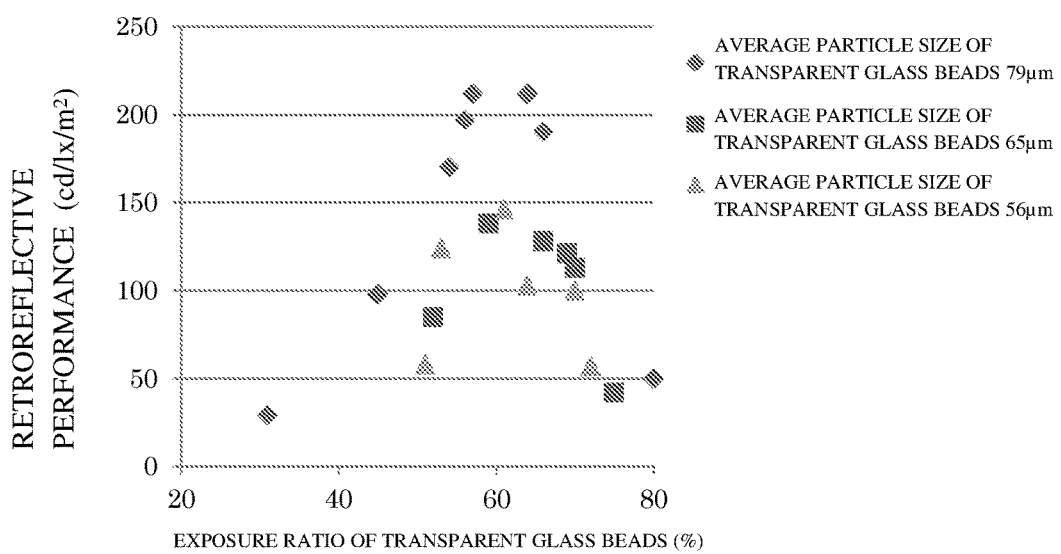
FIG. 3 is a diagram showing the relationship between the exposure ratio of transparent glass beads and the retroreflective performance at an incident angle of 60°.

FIG. 3 shows a summary of the results of evaluating the retroreflective performance at an incident angle of 60°, among the results obtained in Test Examples 1 to 3. As is clear from FIG. 3 and Tables 1 to 3, where the exposure ratio of the transparent microspheres embedded in the retroreflective material was 53 to 70%, the retroreflective performance for incident light with a large incident angle was revealed to be remarkably high. In particular, where the exposure ratio of the transparent microspheres was 53% (Example 10), the retroreflective performance for incident light with an incident angle of 60° was found to be remarkably higher than that where the exposure ratio was 51% (Comparative Example 6). This confirmed that criticality lies in setting the exposure ratio of the transparent microspheres to 53% or more, in terms of retroreflective performance for incident light with a large incident angle. Further, where the exposure ratio of the transparent microspheres was 70% (Examples 9 and 13), the retroreflective performance for incident light with an incident angle of 60° was found to be remarkably higher than that where the exposure ratio was 75% (Comparative Example 5) and 72% (Comparative Example 7). This confirmed that criticality also lies in setting the exposure ratio of the transparent microspheres to 70% or less, in terms of retroreflective performance for incident light with a large incident angle. The results obtained in Test Examples 1 to 3 also revealed that where the exposure ratio of the transparent microspheres was 56 to 66% (Examples 2 to 7, 11 and 12), in particular, where the exposure ratio was 57 to 64% (Examples 3, 4, 11 and 12), the retroreflective performance for incident light with a large incident angle was remarkably high.

REFERENCE SIGNS LIST

1 Support
2 Fixing resin layer
3 Reflective layer
4 Transparent microspheres
5 Transparent resin layer

The invention claimed is:

1. A retroreflective material comprising:
a fixing resin layer;
transparent microspheres embedded in the fixing resin layer; and
a reflective layer provided between the transparent microspheres and the fixing resin layer,
wherein the reflective layer is formed of a metal, the transparent microspheres have a refractive index of 1.8 to 2.2, and the transparent microspheres are exposed in air with an exposure ratio of 53% to 70%, and
wherein the retroreflective material has retroreflective performance of 100 cd/lx/m$^2$ or more for incident light with an incident angle of 60°, as measured by preparing specimens where the retroreflective material is cut into six pieces having a width of 70 mm and a length of 150 mm and a cut piece of the retroreflective material is attached to an A5052P aluminum plate having a width of 70 mm, a length of 150 mm, and a thickness of 0.5 mm using a double-sided adhesive tape, where the number of specimens is six for each retroreflective material, where the resulting specimens are allowed to stand in a chamber controlled to a temperature of 23±2° C. and a relative humidity of 50±15%, where the six specimens prepared are subsequently aligned to make attest section measuring 420 mm×150 mm, where a test apparatus for testing the specimens is equipped with a projector having an emission port diameter of 3.4 mm and a light receiver and the distance from the lens surface of the projector to the surface of each specimen, as well as the distance from the specimen surface to the light receiver, is adjusted to 15 m, where standard illuminant A is used as the light source of the projector and the light receiver used has a visible-region relative spectral responsivity characteristic approximated to the standard spectral luminous efficiency, and one or more color corrections are made as required, where an observation angle is set to 0.2°, and the incident angle is set to 5°, 20°, 30°, 40°, 50°, and 60°, provided that the clockwise direction is defined as positive, and where the retroreflective performance (cd/lx/m$^2$) at each incident angle is measured.

2. The retroreflective material according to claim 1, wherein the transparent microspheres have an average particle size of 30 to 200 μm.

3. The retroreflective material of claim 1, wherein the transparent microspheres have an average particle size of 40 to 120 μm.

4. The retroreflective material of claim 1, wherein the transparent microspheres are embedded in contact with a surface of the reflective layer.

5. The retroreflective material of claim 1, wherein a transparent resin layer is provided between the transparent microspheres and the reflective layer.

6. The retroreflective material of claim 1, further comprising a support, wherein the fixing resin layer is held on the support.

* * * * *